(12) United States Patent (10) Patent No.: US 8,660,770 B2
Fernandez et al. (45) Date of Patent: Feb. 25, 2014

(54) SYSTEM FOR CONTROLLING AT LEAST ONE AIRCRAFT ENGINE AND AN AIRCRAFT COMPRISING SUCH A CONTROL SYSTEM

(75) Inventors: Brice Fernandez, Toulouse (FR); Vincent Lamonzie, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 658 days.

(21) Appl. No.: 12/786,269

(22) Filed: May 24, 2010

(65) Prior Publication Data
US 2010/0305825 A1 Dec. 2, 2010

(30) Foreign Application Priority Data
May 29, 2009 (FR) ...................................... 09 02596

(51) Int. Cl.
*G06F 19/00* (2011.01)
(52) U.S. Cl.
USPC .......................................... 701/99; 244/76 R
(58) Field of Classification Search
USPC ............... 701/99, 7, 3, 15, 16, 14, 29.1, 29.7, 701/30.2–30.4; 244/76 R, 195
See application file for complete search history.

(56) References Cited

U.S. PATENT DOCUMENTS

| 2,740,255 | A | 4/1956 | Machlanski |
| 4,373,184 | A | 2/1983 | Lambregts |
| 4,662,171 | A | 5/1987 | Jackson et al. |
| 5,029,778 | A | 7/1991 | DeLuca |
| 5,299,765 | A | 4/1994 | Blechen |
| 5,613,652 | A | 3/1997 | Greene |
| 6,189,836 | B1 | 2/2001 | Gold et al. |
| 6,224,021 | B1 | 5/2001 | Tanaka |
| 6,880,784 | B1 * | 4/2005 | Wilkinson et al. .......... 244/76 R |
| 6,898,491 | B2 | 5/2005 | Muller et al. |
| 7,343,232 | B2 | 3/2008 | Duggan et al. |
| 7,599,767 | B2 * | 10/2009 | Fukuda ............................ 701/4 |
| 7,930,075 | B2 * | 4/2011 | Alcantara et al. ............... 701/15 |
| 2005/0236525 | A1 | 10/2005 | Marjanski |
| 2009/0045296 | A1 | 2/2009 | Cerchie et al. |
| 2009/0126683 | A1 | 5/2009 | Perie et al. |

FOREIGN PATENT DOCUMENTS

| EP | 0431655 | 6/1991 |
| GB | 731735 | 6/1955 |

OTHER PUBLICATIONS

Non Final Office Action (USPTO) mailed Mar. 14, 2012 in U.S. Appl. No. 12/787,272 (7 pages).

* cited by examiner

*Primary Examiner* — Marthe Marc-Coleman
(74) *Attorney, Agent, or Firm* — Novak Druce Connolly Bove + Quigg LLP

(57) ABSTRACT

A system for controlling at least one aircraft engine and an aircraft comprising such a control system are disclosed. The system (4) comprises a control lever (5), the intermediary range of automatic regulation thereof of the engine speed comprises a single marked position (II) with which there are associated a climbing speed and an automatic regulation speed. Such a lever is able to occupy another take-off and go-around marked position, with which there are associated a take-off speed and a go-around speed.

7 Claims, 2 Drawing Sheets

SYSTEM FOR CONTROLLING AT LEAST ONE AIRCRAFT ENGINE AND AN AIRCRAFT COMPRISING SUCH A CONTROL SYSTEM

CROSS-REFERENCE TO RELATED APPLICATIONS

This application claims priority to French Patent Application 0902596, filed May 29, 2009, the contents of which are incorporated herein by reference.

FIELD OF THE INVENTION

The present invention relates to a system for controlling an aircraft engine, as well as an aircraft comprising such a control system.

BACKGROUND OF THE INVENTION

It is known that, in a large number of aircrafts, including those for civil transport, the engine speeds are controlled individually during a flight (comprising take-off, climbing, cruising, descent and approach phases) by throttle control levers, respectively associated with said engines. Such control levers are able to occupy one position amongst a plurality of positions, including:

an idling or idle position;
a first marked climbing position;
a second marked climbing position, allowing to obtain either a maximum continuous thrust (MCT) speed at the output of the corresponding engine, when at least one of the engines of such an aircraft breaks down, or a flexible take-off (FLEX TO) speed allowing to perform a take-off with a reduced thrust. For performing such a take-off at a FLEX TO speed, the pilot should preliminarily configure specific parameters of said speed. In the absence of configuration of the latter, the MCT speed is applied by default to the corresponding engine upon take off; and
a marked take-off and go-around position corresponding to a speed delivering a maximum take-off or go-around thrust at the output of the engines.

Moreover, each control lever could occupy an auto-thrust (A/THR) intermediary range of automatic regulation in the corresponding engine speed, by an automatic pilot of the aircraft. Such an intermediary range extends from the idle position to the first climbing position.

However, it happens that the pilot, wishing to take off in a FLEX TO derated take-off speed, positions the control levers in the second climbing position, but forgets to configure the parameters associated with such a FLEX TO speed. In such a case, the MCT speed is applied by default to the engines upon the take-off, what can surprise the pilot (thinking he is taking off at a FLEX TO speed) and lead to take inappropriate actions on the levers with a view to correcting his mistake.

Moreover, should one of the engines of the aircraft break down upon a FLEX TO take-off (the control levers occupy the second climbing position), the pilot should position the control levers in the take-off and go-around position, then position them in the second climbing position, for selecting the MCT speed. Whereas the pilot is already to manage the engine break down, such a reciprocating movement of the control levers, not intuitive for the pilot, is likely to further disturb him.

SUMMARY OF THE INVENTION

The aim of the present invention is to overcome such drawbacks and, more particularly to make the handling and the use of the control levers of the engines more intuitive for the pilot of the aircraft.

To this end, according to this invention, the system for controlling at least one aircraft engine through a specific moving control lever, said lever being able to occupy two extreme positions corresponding to the idle speed and to the maximum speed of said engine, as well as an intermediary range of automatic regulation of the speed of said engine, the lower limit of said intermediary range being defined by the extreme position corresponding to the idle speed, is characterized in that:

said intermediary range comprises a single marked position, corresponding to the upper limit thereof, with which there are likely to be associated at least one engine speed corresponding to the climbing phase of said aircraft and at least one automatic speed corresponding to said automatic regulation, following the climbing phase;
said lever is able to occupy another take-off and go-around marked position, with which there are likely to be associated a take-off speed and a go-around speed; and
said system comprises:
means for determining the usual flight phase of said aircraft; and
means for automatically controlling the speeds of said engine associated with each one of said marked positions.

Thus, according to this invention, the control system comprises a marked position only dedicated to the take-off and go-around phase, as well as a marked position, dedicated, as far as it is concerned, only to the climbing and automatic regulation phase, making the handing of the control lever intuitive and considerably reducing the inappropriate handlings of the latter. Moreover, each lever can occupy an emergency position (in the present case, the maximum speed extreme position), allowing to get the aircraft out of a possible critical situation by bringing a maximum thrust in the output of the corresponding engine.

Said speed corresponding to the climbing phase of said aircraft, likely to be associated with said marked position of the intermediary range, as well said take-off speed and said go-around speed, can be determined either automatically or manually by the pilot. In the case of an automatic determination, the pilot's work load is reduced.

Advantageously, said automatic control means can automatically manage the speed transitions of each one of said marked positions of said control lever, contributing to decrease the pilot's work load.

Moreover, when said lever occupies said marked position of the intermediary range, the speed transition between the climbing phase and the automatic speed regulation can be performed automatically as soon as the climbing phase of said aircraft is completed.

Furthermore, said lever can be maintained in the extreme position corresponding to the maximum speed only by a voluntary action of the pilot, the latter spontaneously returning to said marked take-off and go-around position with no action from the pilot.

Obviously, this invention further relates to a control lever for an aircraft engine belonging to a control system such as previously described and able to occupy two extreme positions, corresponding to the idle speed and to the maximum speed of said engine, as well as an intermediary range of automatic regulation of the speed of said engine, the lower limit of said intermediary range being defined by the extreme position corresponding to the idle speed.

According to this invention, said intermediary range comprises a single marked position, corresponding to the upper limit thereof, with which there are likely to be associated at least one engine speed corresponding to the climbing phase of said aircraft and at least one automatic speed corresponding to said automatic regulation, following the climbing phase. Besides, said lever is able to occupy another take-off and go-around marked position, with which there are likely to be associated a take-off speed and a go-around speed; and Furthermore, said lever is maintained in the extreme position corresponding to the maximum speed only by a voluntary action of the pilot, the latter spontaneously returning to said marked take-off and go-around position with no action from the pilot.

Furthermore, this invention also relates to an aircraft comprising a control system such as described herein above.

BRIEF DESCRIPTION OF THE DRAWINGS

The figures of the appended drawing will better explain how this invention can be implemented. In the figures identical reference numerals relate to similar components.

DETAILED DESCRIPTION

Figure 1:
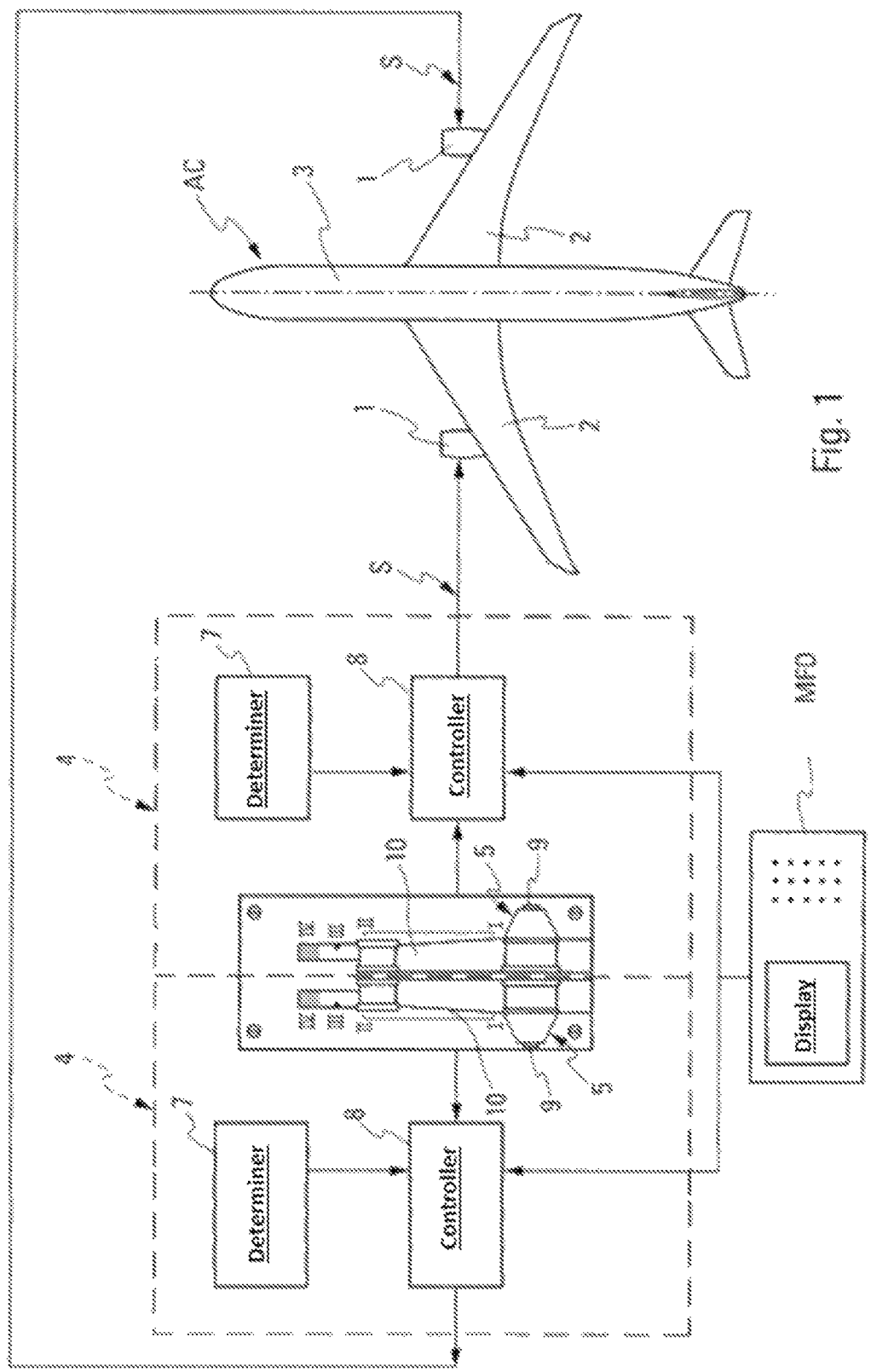
FIG. 1 schematically shows from the top a two-engine airplane as well as the block diagram of each one of the control systems for the two engines of the airplane. For clarity reasons in the drawing, such control systems are illustrated outside said airplane.

On FIG. 1, there is represented, in a top view, an airplane AC comprising two engines 1 supported on each one of the two wings 2 thereof, symmetrically with respect to the fuselage 3.

As shown on FIG. 1, the speed of each of the engines 1 of the airplane AC can be controlled through a control system 4, according to the present invention, by means of a specific moving control lever 5.

Figure 2:
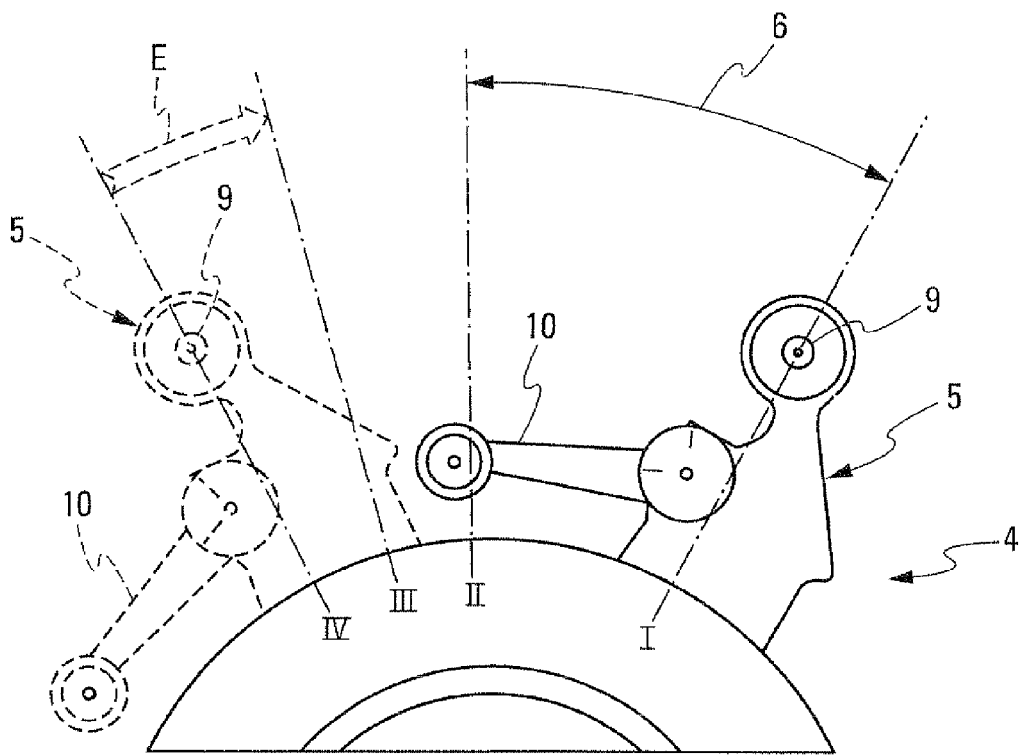
FIG. 2 is a profiled schematic view of one of the moving control levers shown on FIG. 1.

Each control lever 5 can occupy two extreme positions corresponding to the idle speed (designated with I on FIGS. 1 and 2) and to the maximum speed (designated with IV on said figures) of the corresponding engine 1, a take-off and go-around marked position (for instance, by a hard point of the catch type) (designated with III) as well as an A/THR intermediary range of automatic regulation of the speed for said engine 1 (symbolized by the arrow 6 on FIG. 2).

For each control lever 5, the extreme position of idle speed I is for instance used upon starting the corresponding engine 1, preliminarily to implementing the thrust inversion mode, upon landing, etc. It could be materialized by a fixed stop.

In addition, according to this invention, the maximum speed position IV of each lever 5 corresponds to the thrust maximum speed available at the output of the corresponding engine 1. Such a speed is reached when the control lever 5 is brought, by a voluntary action of the pilot, against a stroke end fixed stop (the control lever 5 is illustrated in dashed lines in such position on FIG. 2). When the pilot releases said lever 5, the latter spontaneously returns in the take-off and go-around position III, via, for example, return elastic means (symbolized by the dashed arrow E).

In addition, the intermediary range 6 of each control lever 5 comprises a single marked position (designated with II on FIGS. 1 and 2), corresponding to the higher limit thereof. Such a single marked position II is, for instance, materialized by a hard point of the catch type. The lower limit of the intermediary range 6 is, as far as it is concerned, defined by the extreme position I, corresponding to the idle speed.

As shown on FIGS. 1 and 2, the positions I to IV are respectively adjacent two by two. Thus, for bringing a control lever 5 in the position III from the position I, said lever 5 goes through the position II. Similarly, for reaching the position IV from the position II, the control lever 5 goes through the position III.

According to this invention, at least one engine speed corresponding to the climbing phase of the airplane AC and at least one automatic speed corresponding to the automatic regulation, following the climbing phase, can be associated, either automatically or manually, with the marked position II of the intermediary range 6 of each control lever 5. In addition, a take-off and go-around speed can be associated, automatically or manually, with the take-off and go-around marked position. III.

Each control system 4 further comprises:
  means 7 for determining the flight usual phase of the airplane AC (for example, the take-off, the climbing, etc.). Of course, the means 7 could be common to both control systems 4; and
  means 8 for automatically controlling the speeds associated with said marked position II of the intermediary range 6 as well as with said take-off and go-around marked position III, said means 8 being linked to the corresponding control lever 5 and to the determining means 7. From information received from said determining means 7 and/or from the position of the corresponding control lever 5, the automatic control means 8 are able to deliver, at the output, a control signal S of the engine speed 1 associated therewith. It should be noticed that such automatic control means 8 can be integrated into an EEC electronic calculator (<<Electronic Engine Control>>) associated with the corresponding engine 1.

Usually, as shown on FIGS. 1 and 2, each control lever 5 comprises:
  a button 9 for manually deactivating the A/THR automatic regulation of the engine speed, able to be actuated by the pilot when it wishes to disengage such an A/THR automatic regulation; and
  a lever 10 for controlling the thrust inversion mode of the corresponding engine 1, able to be toggled by the pilot in order to activate and adjust the thrust inversion.

According to this invention, preliminarily to each take-off, the pilot can configure the take-off speed, associated with the take-off and go-around marked position III of each control lever 5. The configuration of such a take-off speed could be performed for instance by means of a MFD (<<Multi-Function Display>>) managing multi-function interface. For this, the pilot can select, first of all, the take-off speed amongst the three following speeds:
  a first FLEX TO derated take-off speed;
  a second DERATED TO (<<Derated. Take Off>>) derated take-off speed; and
  a MAX TO (<<Maximum Take Off>>) take-off speed.

Then, when a take-off speed has been selected, the pilot configures the parameters associated with such a selected speed via the MFD managing interface.

By default, when no take-off speed has been configured by the pilot, the MAX TO maximum thrust take-off speed can be applied upon the airplane AC taking off, when said control lever 5 occupies the position III.

In addition, on the ground or in flight, the pilot can configure the go-around speed, associated with the take-off and go-around position III of each lever 5, via the MFD managing interface. He can select such a speed, for instance, amongst the two following speeds:
- a FLEX GA (<<Flexible Go Around>>) reduced thrust go-around speed; and
- a MAX GA (<<Maximum Go Around>>) maximum thrust go-around speed.

Then, the pilot configures the parameters associated with said selected speed. In the case of the FLEX GA speed, the configuration of the parameters can be automatically carried out in flight by means on board the airplane.

Should a go-around speed be not selected, the MAX GA maximum thrust go-around speed is applied by default.

In flight, the go-around speed is implemented when the lever 5 is brought by the pilot in the take-off and go-around position III.

Of course, alternatively, the configuration of the take-off speed and the go-around speed associated with to the marked position III can be carried out automatically.

Furthermore, several speeds can be associated with the marked position II of the intermediary range 6.

Thus, on the ground or in flight, the pilot can configure (for instance by means of the MFD managing interface) a climbing speed associated with the marked position II of each control lever 5. Such a climbing speed corresponds to the speed automatically applied to the engine 1 by the automatic control means 8 upon the climbing phase (following the take-off phase), when the lever 5 is brought by the pilot in the position II from the position III.

For this, the pilot can first of all select the climbing speed for instance, amongst the three following speeds:
- a first FLEX CL (<<Flexible Climb>>) reduced thrust climbing speed;
- a second DERATED CL (<<Derated Climb>>) reduced thrust climbing speed; and
- a MAX CL (<<Maximum Climb>>) maximum thrust climbing speed.

When no configuration of the climbing phase has been carried out by the pilot, the MAX CL speed can be applied by default upon the climbing phase.

Naturally, alternatively, the configuration of the climbing phase can be carried out automatically.

Switching from the climbing phase to the A/THR automatic regulation of the speed of the engines 1 (when such an A/THR automatic regulation is engaged), is automatically carried out as soon as one engagement condition is validated (for example, when a predefined altitude is exceeded).

In addition, upon the climbing phase after take-off, should one of the engines 1 of the plane AC break down, a MCT continuous maximum thrust climbing speed can be applied to the other valid engine 1. Such a MCT speed is selected, either automatically or manually by the pilot using the MFD managing interface.

Furthermore, when the control lever 5 of one of the engines is brought by the pilot in the extreme position IV, the associated automatic control means 8 can automatically control the thrust maximum speed (for MAX TO take-off or MAX GA go-around) at the output of the latter in order to meet the emergency situation of the airplane (upon take-off or in flight).

Thus, for example, when a FLEX TO derated take-off has been configured for the take-off and go-around position III, the automatic control means 8 automatically deselect such a configuration, when the control lever 5 reaches the extreme position IV, for ordering the engine with the take-off maximum thrust. Such a maximum thrust can be maintained even when the pilot releases the control lever 5, which spontaneously returns to the take-off and go-around position III. On the contrary, the configurations of the speeds associated with the marked position II of the intermediary range 6 are kept, so as to proceed with the flight such as initially programmed when the lever 5 occupies such a marked position II.

Advantageously, in order to avoid any untimely de-selection of the configured speed associated with the take-off and go-around position III, a time delay (for example, of one second) can be triggered as soon as the control lever 5 is brought in the extreme position IV. When such a time delay expires, the take-off and go-around speeds associated with the position III are deselected and the maximum thrust speed is applied to the engine.

Furthermore, upon a take-off, one of the engines of the airplane can meet problems (for instance a high temperature of burnt gases, strong vibrations, a defective fuel supply controller, etc.), requiring the speed being applied to it to be reduced. Also, the pilot can shift the corresponding control lever 5 so as to bring it from the take-off and go-around position III to an intermediary position between such a position III and the marked position II of the intermediary range 6. The speed of the engine being considered is then reduced with respect to that applied when the control lever 5 occupied the take-off and go-around position III.

In the case where the corresponding control lever 5 is brought as far as the marked position II (from the take-off and go-around position III), the A/THR automatic regulation of the engine speed is activated (when it has not been preliminarily disengaged by the pilot) by the automatic control means 8.

Furthermore, should one of the engines of the airplane break down upon a reduced thrust take-off (the FLEX TO speed or the DERATED TO speed has been configured and associated with the take-off and go-around position III), the pilot may decide:
- either to keep the speed of the valid engine such as preliminarily configured. In such a case there is no shift of the corresponding control lever 5. This is required when the DERATED TO speed is implemented upon a take-off. On the contrary, it is up to the pilot's appreciation to decide whether to keep the speed of the valid engine 1, when the FLEX TO speed has been configured for taking off;
- or to increase the speed of the valid engine 1 of the airplane. In such a case, the pilot can decide to apply to said valid engine 1:
  - either the take-off maximum speed. All the control levers 5 are then brought in the extreme position IV, disengaging the reduced thrust take-off (FLEX TO or DERATED TO) speed associated with the take-off and go-around position III;
  - or an intermediary speed comprised between the speed associated with the FLEX TO or the DERATED TO speed and the take-off maximum speed. To do this, the pilot shifts all the control levers 5 from the position III to the position IV, then brings them back in an intermediary position between the position III and the position II of the intermediary range 6.

Moreover, when one of the engines of the airplane breaks down after a take-off (the control levers 5 occupying the marked position II of the intermediary range 6), the MCT continuous maximum thrust speed is selected and applied to the remaining valid engine 1. Such a selection is performed either automatically or manually by the pilot, for example, by means of the MFD managing interface.

Figure 3:
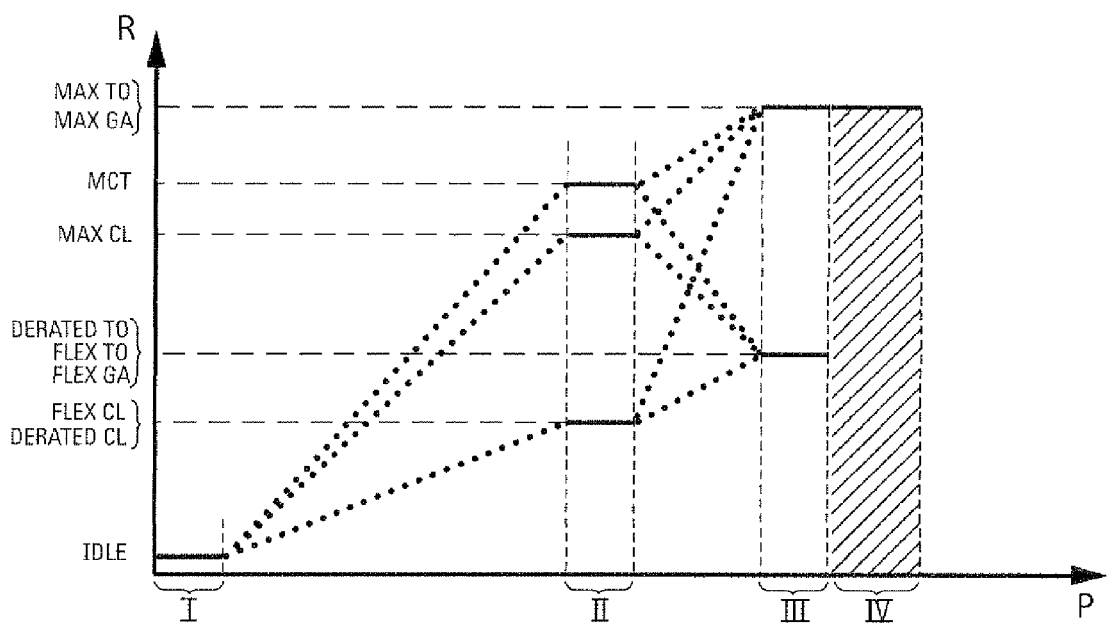
FIG. 3 is a graph representing the different speeds available in an engine of the airplane as a function of the position of the corresponding control lever, according to the present invention.

On FIG. 3, there are represented the different speeds available for each one of the positions I to IV that a control lever 5 can possibly occupy.

The invention claimed is:

1. A system for controlling at least one engine (1) of an aircraft (AC), comprising a specific moving control lever (5), said lever (5) being able to occupy two extreme positions (I, IV) corresponding to an idle speed (I) and to a maximum speed (IV) of said engine (1), as well as an intermediary range of automatic regulation of the speed of said engine (1), a lower limit of said intermediary range being defined by the extreme position (I) corresponding to the idle speed, wherein:

said intermediary range (6) comprises a single marked position (II), corresponding to an upper limit thereof, with which there are associated at least one engine speed corresponding to a climbing phase of said aircraft (AC) and at least one automatic speed corresponding to said automatic regulation, following the climbing phase;

said lever (5) is able to occupy another take-off and go-around marked position (III), with which there are associated a take-off speed and a go-around speed; and said system (4) further comprising:

a processor (7) for determining a usual flight phase of said aircraft (AC); and a controller (8) for automatically controlling the speeds of said engine (1) associated with each one of said marked positions (II, III), wherein the speed corresponding to the climbing phase of said aircraft (AC), associated with said marked position (II) of the intermediary range (6), as well as said take-off speed and said go-around speed, associated with said take-off and go-around marked position (III), are automatically determined.

2. The system according to claim 1, wherein the speed corresponding to the climbing phase of said aircraft (AC), associated with said marked position (II) of the intermediary range (6), as well as said take-off speed and said go-around speed, associated with said take-off and go-around marked position (III), are manually determined by a pilot.

3. The system according to claim 1, wherein the automatic controller (8) automatically manages a speed transition associated with each one of said marked positions (II, III) of said control lever (5).

4. The system according to claim 3, wherein, when said lever (5) occupies said marked position (II) of the intermediary range (6), the speed transition between the climbing phase and the speed automatic regulation is automatically performed as soon as the climbing phase of said aircraft (AC) is completed.

5. The system according to claim 1, wherein the lever (5) is kept in the extreme position (IV) corresponding to the maximum speed only by a voluntary action of a pilot, the lever (5) spontaneously returning to said take-off and go-around marked position (III) with no action from a pilot.

6. The control lever of an engine (1) of an aircraft (AC) belonging to a control system according to claim 1, said lever (5) being able to occupy two extreme positions (I, IV) corresponding to the idle speed (I) and to the maximum speed (III) of said engine (1), as well as an intermediary range of automatic regulation of the speed of said engine (1), the lower limit of said intermediary range being defined by the extreme position (I) corresponding to the idle speed, wherein:

said intermediary range (6) comprises a single marked position (II), corresponding to the upper limit thereof, with which there are associated at least one engine speed corresponding to the climbing phase of said aircraft (AC) and at least one automatic speed corresponding to said automatic regulation, following the climbing phase;

said lever (5) is able to occupy another take-off and go-around marked position (III), with which there are associated a take-off speed and a go-around speed; and said lever (5) is kept in the extreme position (IV) corresponding to the maximum speed only by a voluntary action of a pilot, the lever (5) spontaneously returning to said take-off and go-around marked position (III) with no action from the pilot.

7. An aircraft, wherein it comprises a control system (4) according to claim 1.

* * * * *